United States Patent
Lee

(10) Patent No.: US 7,462,210 B2
(45) Date of Patent: Dec. 9, 2008

(54) DUST COLLECTING UNIT FOR VACUUM CLEANER

(75) Inventor: Jae Hong Lee, Incheon-si (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 11/363,171

(22) Filed: Feb. 28, 2006

(65) Prior Publication Data

US 2007/0012001 A1    Jan. 18, 2007

(30) Foreign Application Priority Data

Jul. 18, 2005    (KR) .................... 10-2005-0064740

(51) Int. Cl.
*B01D 46/00* (2006.01)

(52) U.S. Cl. .............. 55/311; 55/313; 55/429; 55/DIG. 3; 96/400; 96/403

(58) Field of Classification Search ............. 55/309, 55/310, 311, 312, 313, 356, 357, 417, 429, 55/472; 15/347; 96/399, 400, 403, 405
See application file for complete search history.

(56) References Cited

U.S. PATENT DOCUMENTS

| | | | | |
|---|---|---|---|---|
| 3,172,743 A * | 3/1965 | Kowaleski | ............... | 96/404 |
| 3,279,418 A * | 10/1966 | Nilsson | ............... | 116/70 |
| 4,020,525 A * | 5/1977 | Fromknecht et al. | ......... | 15/339 |
| 4,063,326 A * | 12/1977 | Fromknecht | ............... | 15/327.1 |
| 4,124,916 A * | 11/1978 | Fromknecht | ............... | 15/339 |
| 5,201,095 A * | 4/1993 | Choi | ............... | 15/339 |
| 6,231,649 B1 * | 5/2001 | Dyson et al. | ............... | 96/403 |
| 6,349,738 B2 * | 2/2002 | Dyson et al. | ............... | 137/114 |
| 6,651,294 B2 * | 11/2003 | Ji | ............... | 15/339 |
| 6,845,543 B2 * | 1/2005 | Kim | ............... | 15/412 |
| 7,278,180 B2 * | 10/2007 | Pyeong | ............... | 15/412 |
| 7,300,482 B2 * | 11/2007 | North | ............... | 55/312 |
| 2006/0021187 A1 * | 2/2006 | Kim | ............... | 15/412 |

* cited by examiner

*Primary Examiner*—Duane S. Smith
*Assistant Examiner*—Robert A Clemente
(74) *Attorney, Agent, or Firm*—Ked & Associates, LLP

(57) ABSTRACT

A dust collecting unit for a vacuum cleaner is provided. The dust collecting unit includes a filter assembly for filtering foreign objects coupled to a dust collecting cover which covers a dust collecting canister (320). The dust collecting canister receives and air foreign object mixture and accumulates the foreign objects therein. The filter assembly is disposed inside the dust collecting canister and filters out the foreign objects from the mixture. A damper assembly that selectively provides outside air to the inside of the dust collecting cover is positioned within the dust collecting cover. When pressure within the vacuum cleaner is increased due to an excessive amount of foreign objects accumulated in the canister, the damper assembly is activated to allow entry of outside air to relive the internal pressure and avoid a fan motor overload. In this manner, the damper assembly can quickly react to an increase in internal pressure and avoid damage to the fan motor cause by an overload.

17 Claims, 7 Drawing Sheets

RELATED ART

RELATED ART

DUST COLLECTING UNIT FOR VACUUM CLEANER

BACKGROUND OF THE INVENTION

1. Field of the Invention

The present invention relates to a vacuum cleaner, and more particularly, to a dust collecting unit for a vacuum cleaner.

2. Background of the Related Art

FIG. 1 is a rear perspective view of an upright vacuum cleaner according to the related art. The upright vacuum cleaner includes a head 10 that moves across a floor surface, a body 20 which houses a device that generates a suction force which is transmitted through the head 10 so as to suck air containing foreign objects in through the head 10 as it moves across the floor, and a handle 30 installed on top of the body 20 which allows a user to direct the vacuum cleaner as necessary.

The head 10 moves in close proximity to the surface of the floor, and air is suctioned through a suctioning port (not shown) disposed on the bottom of the head 10. That is, the suctioning port (not shown) provides a main suctioning passage disposed at the bottom of the head 10 for suctioning outside air and guiding the intake of air.

A cylindrical dust collecting unit (not shown) is detachably coupled to the body 20. The dust collecting unit filters foreign objects from the air suctioned through the head 10.

FIG. 2 is a perspective view of a damper assembly provided inside the body 20 of the related art vacuum cleaner shown in FIG. 1. A fan motor (M) which generates a suction force when a current is applied thereto is housed inside the body 20. The suction force generated by the fan motor (M) allows air and foreign objects to be suctioned through the head 10 from the outside.

A body intake port 70 positioned above the fan motor (M) is also provided in the body 20. The body intake port 70 is in communication with one end of the dust collecting unit to guide air filtered inside the dust collecting unit inside the body 20. A passage 72 extends between the body intake port 70 and the fan motor (M) to guide air that is filtered by the dust collecting unit from the body intake port 70 to the fan motor (M. The passage 72 forms an interior space which communicates with the body intake port 70 and the fan motor (M) when the body 20 is assembled.

A damper assembly 80 is installed in the lower surface of the passage 72. The damper assembly 80 can be selectively opened to provide for communication between the inside of the body 20 and the outside to prevent overload of the fan motor. When a large quantity of foreign objects are amassed inside the dust collecting unit (not shown), the fan motor (M) experiences a great deal of difficulty in generating an adequate suction force, imposing an overload on the fan motor (M). To alleviate this condition, the damper assembly 80 is opened, providing for communication between the inside of the body 20 and the outside, and allowing the fan motor (M) to more easily suction air.

However, this structure has numerous problems. Specifically, the damper assembly 80, which is used to facilitate the suctioning of air by the fan motor (M) and prevent damage to the fan motor (M) is installed inside the body 20. Thus, a reaction time when an excessive amount of foreign objects are collected in the dust collecting unit is slow, limited by its installation internal to the body 20, and relies on user intervention.

Further, because there is no external indicator of the increased internal pressure, a user must notice a loss of suction to determine that the amount of foreign objects collected in the dust collecting unit is excessive and pressure has increased inside the body 20. The pressure increase is conveyed through the body intake port 70 and the passage 72 prior to taking action, thus further increasing the duration of an overload condition imposed on the motor (M). This extended duration overload condition which exists before the user becomes aware of the overload condition and takes action can cause the fan motor (M) to overheat and be damaged, resulting in unanticipated repair costs, loss of use, and other inconveniences which cause customer dissatisfaction.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the invention is to substantially obviate one or more problems due to limitations and disadvantages of the related art.

An object of the invention is to reduce overload to a motor.

Another object is to prevent damage to a motor.

Another object of the invention is to provide indication of possible motor overload and/or motor damage and/or to provide indication of a full canister.

To achieve these objects and other advantages and in accordance with the purpose of the invention, as embodied and broadly described herein, there is provided a dust collecting unit for a vacuum cleaner, including a dust collecting canister having an inside for receiving air including foreign objects that are suctioned with a suctioning force of a fan motor, the dust collecting canister for collecting the received foreign objects, a filter assembly disposed inside the dust collecting canister for selectively allowing only the air to pass through to an inside of the filter assembly and filtering the foreign objects, and a dust collecting cover sealing the inside of the dust collecting canister for guiding a flow of the air that passes through the filter assembly, wherein the dust collecting cover includes a damper assembly installed on an inner side thereof, the damper assembly for selectively operating to open the inside of the dust collecting cover to an outside when an overload is incurred on the fan motor.

The damper assembly may have a space forming plate forming a bottom outer surface of the dust collecting cover, the space forming plate having a hole formed in a central portion thereof for guiding a flow of the air inside the dust collecting canister into the dust collecting cover.

The space forming plate may have a through-hole formed through a portion thereof for communicating the hole with the damper assembly.

The damper assembly may further include a damper body formed in a tube shape to communicate with the hole and the inside of the dust collecting cover for selectively guiding the air inside the dust collecting cover to the inside of the dust collecting canister, an elastic member provided inside the damper body for imparting elastic force, a sealing member elastically supported by the elastic member, the sealing member for sealing an inside of the damper body, and an enclosing member for enclosing a portion of the damper body to prevent the sealing member from dislodging from the damper body to an outside.

The damper assembly may further include a retaining portion formed to protrude from a respective end of the damper body and the sealing member to mutually face one another, the retaining portion for preventing a dislodging of the elastic member.

The dust collecting cover may further include an outside air intake hole formed on a surface of the dust collecting cover, the outside air intake hole for allowing outside air to enter the inside of the dust collecting cover during an operation of the damper assembly.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
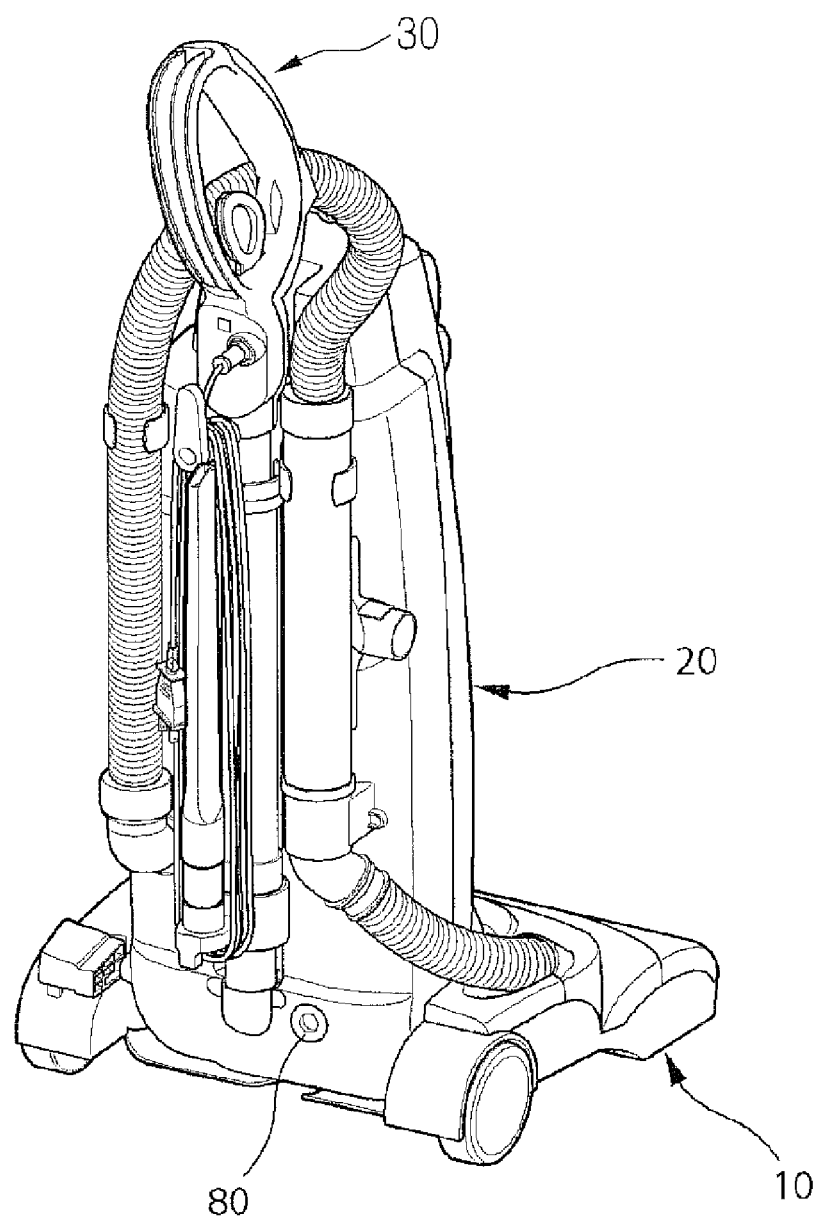
FIG. 1 is a rear perspective view of a related art upright vacuum cleaner.
Figure 2:
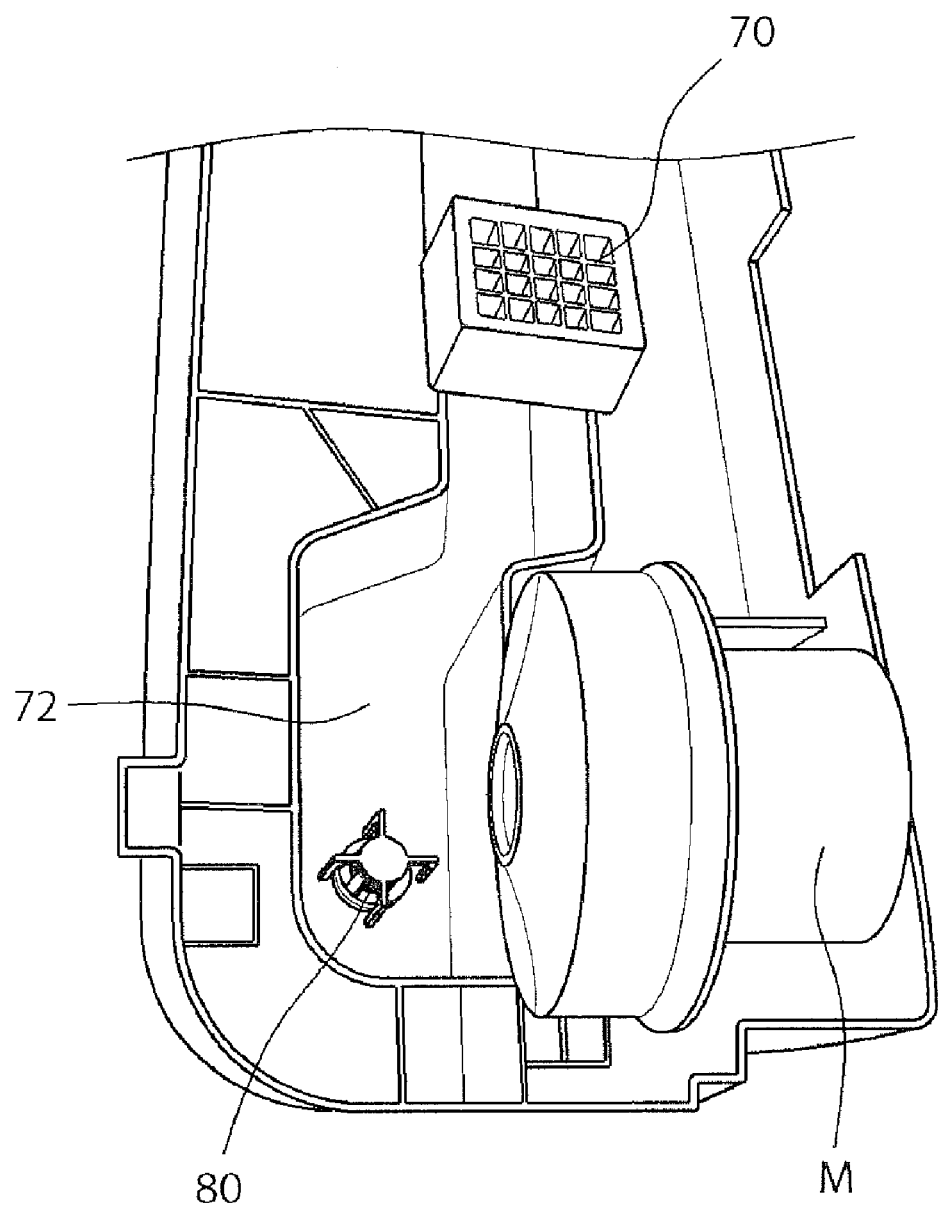
FIG. 2 illustrates a damper assembly provided inside a body of the related art upright vacuum cleaner shown in FIG. 1.
Figure 3:
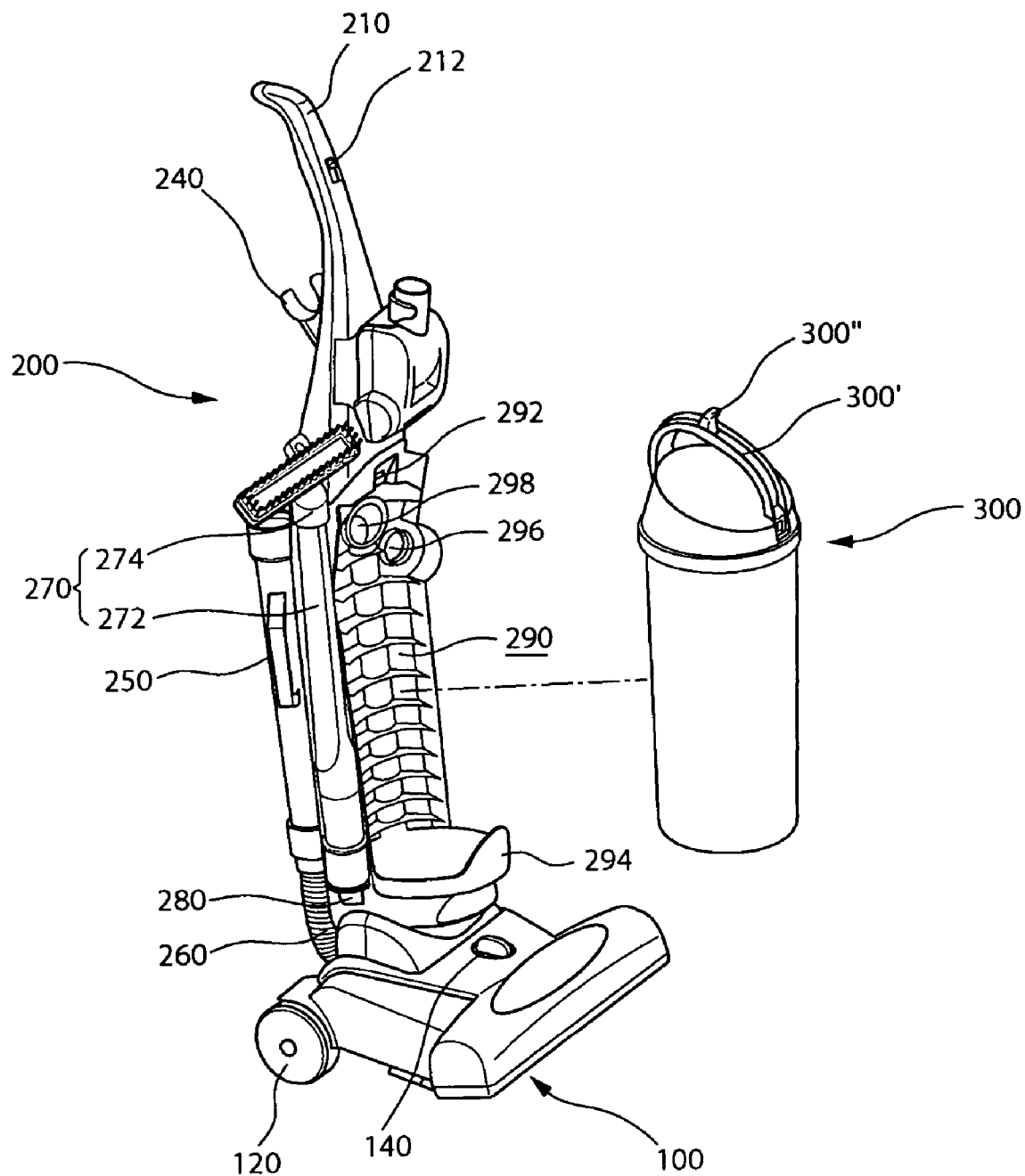
FIG. 3 is a partially exploded perspective view of an outer structure of an upright vacuum cleaner in accordance with an embodiment of the invention.

As shown in FIG. 3, a vacuum cleaner includes a head 100 that suctions air and foreign objects from the outside as it moves along a floor, a body 200 pivotably connected to the head 100 the body 200 including a fan motor (not shown) and a plurality of other components installed therein, and a dust collecting unit 300 for collecting foreign objects therein. The dust collecting unit 300 can be selectively attached to and removed from an external portion of the body 200.

The head 100 may include a perforated suctioning port (not shown) provided on a bottom portion of the head 100 that communicates with its interior. Air and foreign objects on the floor are suctioned through the suctioning port as the head 100 moves along the floor. The head 100 may have a wheel 120 on each side thereof to facilitate this movement.

The body 200 may be pivotably coupled to the head 100 such that the body 200 may be positioned at an incline with respect to the head 100 within a given angular range. A pivot lever (not shown) may be used to selectively control this pivoting.

A height adjusting knob 140 may be provided to adjust a distance between the bottom of the head 100 and the floor. The height adjusting knob 140 is preferably rotatively installed, and rotates to adjust the distance between the head 100 and a surface to be cleaned to be cleaned, based on a type of surface to be cleaned, so that the cleaning ability of the vacuum cleaner can be fully utilized.

The body 200 may include a built-in fan motor (not shown) to generate a suction force which sucks foreign objects from a surface to be cleaned with air through the head 100. A handle 210 may be provided at an upper portion of the body 200 for a user to grasp when using the vacuum cleaner during cleaning and to manipulate the vacuum cleaner as necessary. The front of the handle 210 may include a control button 212 that controls operation of the vacuum cleaner.

A hose holder 240 may be provided at an upper portion of the body 200 to hold a flexible connecting hose (not shown) in place. One end of the connecting hose held by the hose holder 240 may be connected to the fan motor (not shown) in the body 200, and the other end of thereof may be coupled to an extension tube 250 that will be described below. The suction force generated by the fan motor may be transferred to the extension tube 250 via the extension hose (not shown).

The extension tube 250 is formed with concentric and overlapping tubes of different diameters, allowing a length of the extension tube 250 to be adjusted as necessary, and can be selectively detached from the rear surface of the body 200 and coupled to various accessories 270. The lower end of the extension tube 250 is preferably flexible and may be detachably coupled to a suctioning hose 260. The lower end of the extension tube 250 may be coupled with one of the accessories 270 so as to suction foreign objects from corners, crevices, and the like as facilitated by the accessories 270.

The accessories 270 are removably attached to the body 200. The accessories 270 may include, for example, a crevice wand 272 for suctioning foreign objects from deep crevices, and a dusting brush 274 for cleaning items such as, for example, furniture. The accessories 270 may be stored on an accessory storing part 280 that protrudes outward from the body 200. Although not shown, a top portion of the accessory storing part 280 may include a cross-shaped portion which protrudes upward to form a movement preventing protrusion that may be force-fit into the crevice wand 272 to limit movement of the crevice wand 272.

A unit mounting portion 290 may be recessed, and preferably concave, at a front lower portion of the body 200 so as to detachably receive the dust collecting unit 300. A detachable recess 292 for confining the upper portion of the dust collecting unit 300 is provided at the upper portion of the unit mounting portion 290, and a unit confining protrusion 294 for confining the front lower portion of the dust collecting unit 300 is provided at the bottom of the unit mounting portion 290, so that the dust collecting unit 300 can be detachably mounted to the body 200.

An intake guide hole 296 for guiding air containing foreign objects into the dust collecting unit 300, and an exhaust guide hole 298 for guiding exhaust air that has been filtered through the dust collecting unit 300 are provided in the upper portion of the unit mounting portion 290. Air and foreign objects that are sucked in through the head 100 enter the dust collecting unit 300 through the intake guide hole 296, and the air and foreign objects are separated. The air in the dust collecting unit 300 is exhausted through the exhaust guide hole 298, while the foreign objects remain in the dust collecting unit 300.

The dust collecting unit 300 may use a cyclonic method to filter foreign objects from the air/foreign objects mixture introduced through the intake guide hole. The dust collecting unit may also filter and collect foreign objects by means of a separate filter, or may use both a cyclonic method and a separate filter to collect foreign objects inside.

A dust collecting handle 300' is provided at an upper portion of the dust collecting unit 300 to allow a user to easily grasp and attach/detach the dust collecting unit 300 from the unit mounting portion 290. A detachable lever 300" provided on the dust collecting handle 300' may hook onto and be confined by the detachable recess 292 to secure and release the dust collecting unit 300 and the unit mounting portion 290.

By grasping the dust collecting handle 300' and operating the detachable lever 300", the confining action of the detachable lever 300" by the detachable recess 292 is released, allowing the dust collecting unit 300 to be removed from the unit mounting portion 290. The detachable lever 300" allows the top portion of the dust collecting unit 300 to be detachably mounted to the unit mounting portion 290. Therefore, when the dust collecting handle 300' is grasped and the detachable lever 300" is pushed backward, the dust collecting unit 300 can be removed from the unit mounting portion 290.

Figure 4:
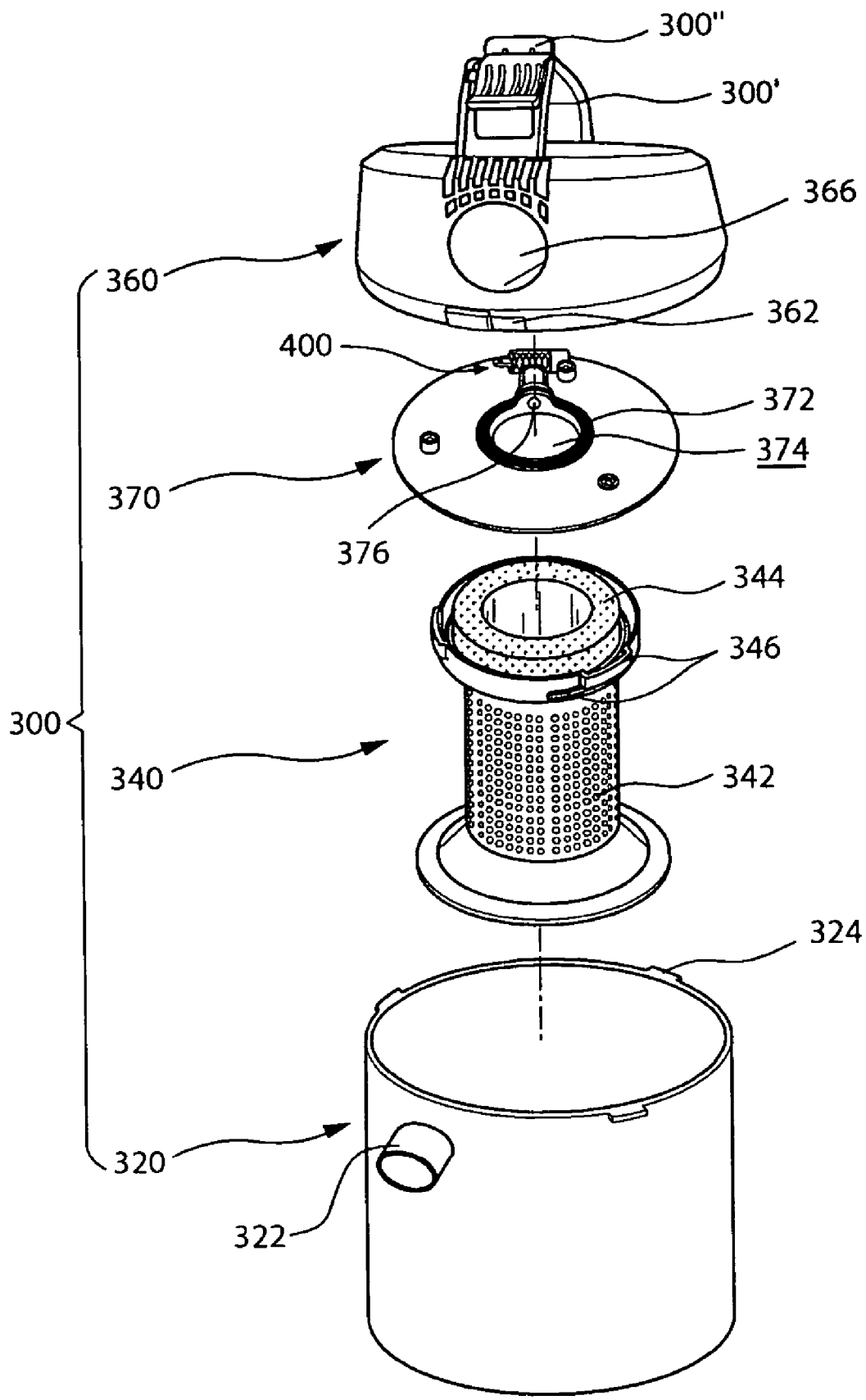
FIG. 4 is an exploded view of a dust collecting unit in accordance with an embodiment of the invention.
Figure 5:
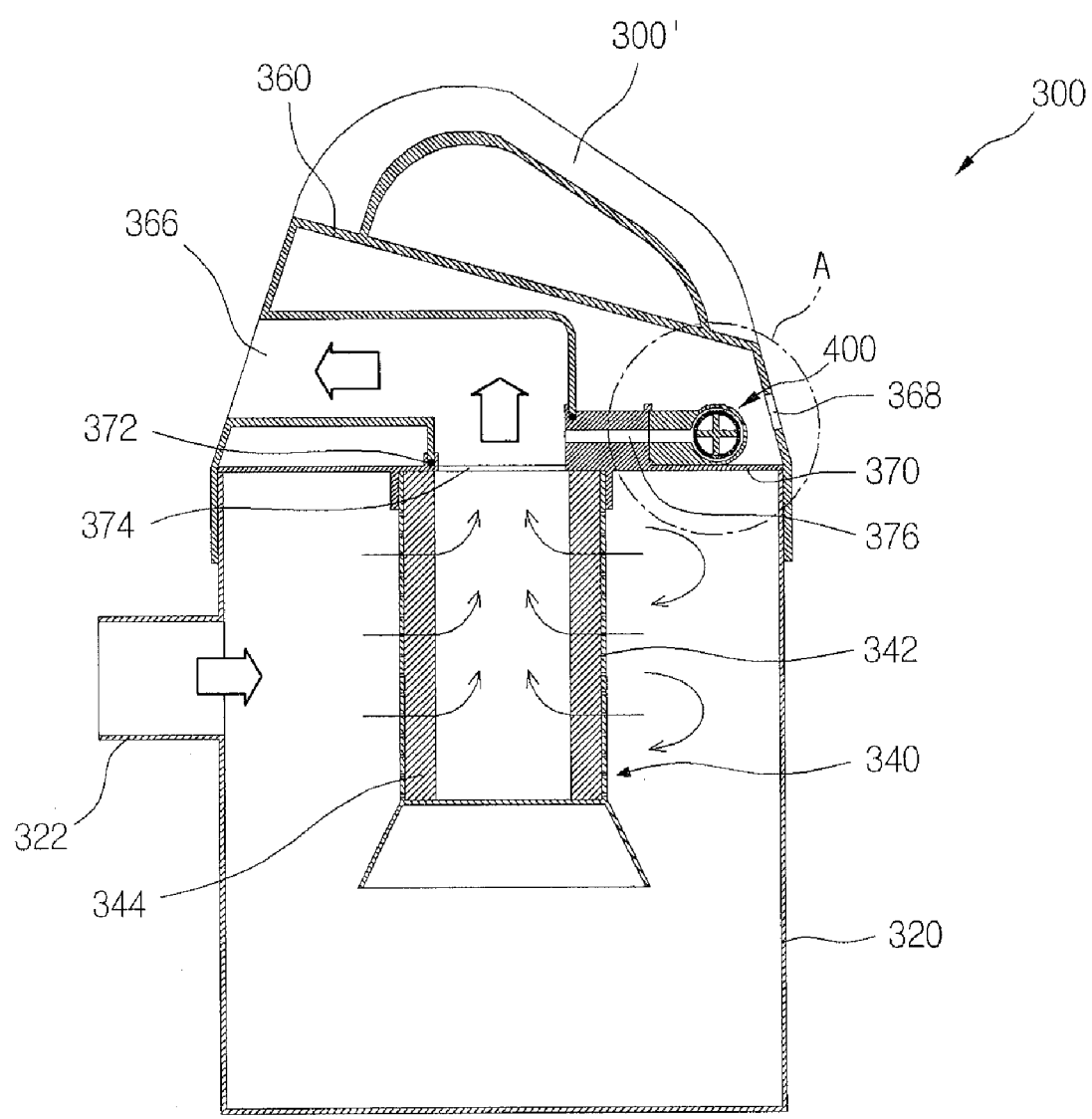
FIG. 5 is a sectional view of an interior structure of a dust collecting unit for a vacuum cleaner in accordance with an embodiment of the invention.
Figure 6:
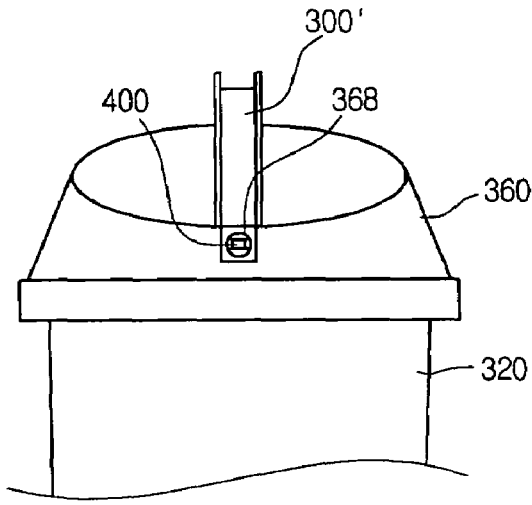
FIG. 6 is an enlarged front view of area A of FIG. 5.

A more detailed explanation of the structure of the dust collecting unit 300 will now be provided with reference to FIG. 4, which is an exploded view of a dust collecting unit in accordance with an embodiment of the invention, FIG. 5, which is a sectional view of an interior structure of the dust collecting unit shown in FIG. 4, and FIG. 6, which is an enlarged front view of area A shown in FIG. 5.

The dust collecting unit 300 includes a dust collecting canister 320 for collecting foreign objects therein, a filter assembly 340 disposed in the center of the dust collecting canister 320 for filtering foreign objects, and a dust collecting cover 360 for selectively sealing the filter assembly 340. In certain embodiments, the dust collecting canister 320 may have a substantially cylindrical shape with an open top portion, and may include an intake guide 322 formed on its outer surface for guiding suctioned air that includes foreign objects into the dust collecting canister 320. More specifically, when the dust collecting unit 300 is installed on the unit mounting portion 290, the intake guide 322 communicates with the intake guide hole 296, so that air containing foreign objects that flows through the intake guide hole 296 is guided into the dust collecting canister 320.

The intake guide 322 preferably causes a rotational flow of air inside the dust collecting canister 320. This may be accomplished by, for example, positioning the intake guide 322 in a tangential direction with respect to the inner surface of the dust collecting canister 320. In this manner, foreign objects and air that enter the dust collecting canister 320 through the intake guide 322 may be guided along the inner surface of the dust collecting canister 320 and revolve within the canister 320 at a relatively high speed to create a rotational flow of air within the canister 320.

The outer perimeter of the upper portion of the dust collecting canister 320 may include a coupling tab 324 which engages a corresponding coupling slot 362 formed on the outer perimeter of the dust collecting cover 360. When so engaged, the dust collecting canister 320 is secured to the dust collecting cover 360. In certain embodiments, the coupling tab 324 may be a rectangular, plate-shaped protrusion which extends outward from the upper perimeter of the canister 320. The canister 320 may include one coupling tab 324, or may include multiple coupling tabs 324.

The filter assembly 340 is disposed inside the dust collecting canister 320. The filter assembly 340 receives the air and foreign objects mixture introduced into the dust collecting canister 320 through the intake guide 322 and allows only air to pass through, filtering the foreign objects out of the mixture.

A plurality of holes 342 may be formed on the outer surface through to the inside of the filter assembly 340 to filter larger foreign objects. A separate filter 344 may be provided inside the filter assembly 340 to filter out smaller foreign objects that have passed through the holes 342 so that air that has been further eliminated of foreign objects enters the inside of the filter 344.

A retainer 346 positioned on the upper outer perimeter of the filter assembly 340 may engage a corresponding catch (not shown) formed on the bottom surface of the dust collecting cover 360, so as to mount filter assembly 340 to the bottom of the dust collecting cover 360, which is positioned on top of the filter assembly 340. The dust collecting cover 360 seals the inner space of the dust collecting canister 320 when the coupling slot 362 formed on its outer perimeter is engaged with the coupling tab 324 of the dust collecting canister 320.

Additionally, the dust collecting covet 360 is also configured to simultaneously guide air circulating inside the dust collecting canister 320 in an upward direction by guiding the air that passes through the filter 344 toward the exhaust guide hole 298 More specifically, a space forming plate 370 is positioned beneath the dust collecting cover 360 to form a bottom outer portion of the dust collecting cover 360. A sealer 372 is attached to a central portion of the space forming plate 370 to define an entry into the dust collecting cover 360 through which air may be introduced.

The space forming plate 370 has a hole 374 formed at a central portion thereof which is in communication with the filter 344 such that air passing through the filter assembly 340 is guided upward through the space forming plate 370. As seen on the left side of the sectional view in FIG. 5, inside the space formed by the space forming plate 370 is an passage 366 in communication with the exhaust guide hole 298 through which the filtered air is exhausted. Although the exhaust passage 366 shown in FIG. 5 is L-shaped, other shapes may also be appropriate. A catch (not shown) protrudes from the bottom of the space forming plate 370 to engage the retainer 346 as described above, so that the filter assembly 340 remains secured and does not disengage from the bottom of the dust collecting cover 360.

A through-hole 376 formed through an upper portion of the space forming plate 370 allows a damper assembly 400 (to be described below) to be selectively opened in response to an increased internal pressure in the dust collecting unit 300 and to provide an external indication of this condition. A front end of the through-hole 376 is positioned at the hole 374 in the space forming plate 370, and the other end of the through-hole 376 is in communication with an inside of the damper assembly 400 . When a large quantity of foreign objects is lodged inside the dust collecting canister 320, air outside the dust collecting cover 360 can enter the dust collecting canister 320 through the through-hole 376 and hole 374 in the space forming plate 370 to alleviate the increased internal pressure.

Accordingly, an outside air intake hole 368 is formed in the outer surface of the dust collecting cover 360, so that air can flow into the space within. Thus, when a large quantity of foreign objects is lodged inside the dust collecting unit 300 and a sudden increase in pressure occurs inside the dust collecting unit 300, outside air may enter through the outside air intake hole 368 by means of the damper assembly 400, so that the fan motor (not shown) is protected from an overload. The positioning of the damper assembly 400 relative to the outside air intake hole 368 in the cover 360 is not necessarily shown to scale in FIGS. 5 and 6. More specifically, the size of the outside air intake hole 368 and the spacing between the hole 368 and the damper assembly 400 may be adjusted based on numerous factors, including, for example, the particular sizing of these components and the operating requirements of the vacuum cleaner.

The damper assembly 400 is installed inside the dust collecting cover 360, and preferably, on top of the space forming plate 370. When an overload of the fan motor (not shown) occurs, the damper assembly 400 can selectively be opened to preclude damage to the fan motor by allowing outside air to enter the dust collecting canister 320. The structure of the damper assembly 400 will be described in detail with reference to FIG. 7.

Figure 7:
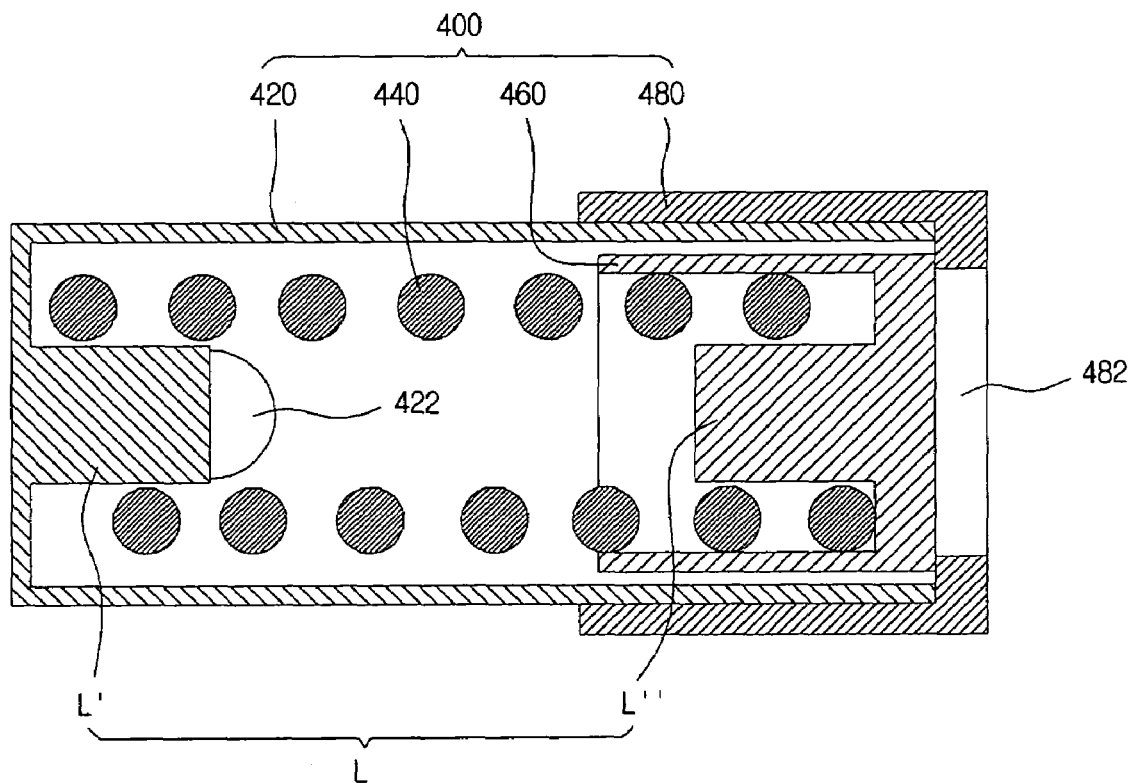
FIG. 7 is a sectional view of a damper assembly of a dust collecting unit for a vacuum cleaner in accordance with an embodiment of the invention.

The damper assembly 400 shown in FIG. 7 is substantially cylindrical in overall form. However, other forms may also be appropriate. The damper assembly 400 may include a damper body 420 that allows air from outside the dust collecting cover 360 to flow therein, an elastic member 440 that provides for elasticity within the damper body 420, a sealing member 460 that is elastically supported by the elastic member 440 and can selectively open and seal the inside of the damper body 420, and a enclosing member 480 for preventing the sealing member 460 from being dislodged from the damper body 420.

The damper body 420 forms a space within its confines and selectively guides outside air through the space as needed. As shown in FIG. 7, one side of the damper body 420 is open, and may be selectively opened and closed by movement of the sealing member 460 to an appropriate position, and the other side of the damper body 420 is substantially tubular, with a damper passage 422 that is in communication with the through-hole 376. When the damper assembly 400 operates, the sealing member 460 is moved away from the open (right) side of the damper body to allow outside air to enter the damper body 420. The outside air passes through the damper passage 422 and the through-hole 376 to the hole 374 in the space forming plate 370.

A retaining portion (L), which may be a pair of cross-shaped portions inside the damper assembly 400, are inserted into the left and right ends of the elastic member 440 as shown in FIG. 7 to prevent dislodging of the elastic member 440 and to guide the elastic member 440 as the elastic member 440 compresses. In certain embodiments, the retaining portion (L) includes a first retaining portion L' that protrudes from the inner left wall of the damper body 420 to receive the left end of the elastic member 440, and a second retaining portion L" that protrudes to the left from the inside of the sealing member 460 to receive the right end of the elastic member 440. Due to the retention provided by the first and second retaining portions L' and L", the elastic member 440 can compress and resume its original shape in a smooth manner within the damper body 420. The circumferences of the first and second retaining portions L' and L" may correspond to the inner diameter of the elastic member 440 to prevent vertical movement of the elastic member 440.

The sealing member 460 is positioned within the right side of the damper body 420, and is selectively moved so as to selectively open and close the open right end of the damper assembly 400. The sealing member 460 is open on its left side, with the second retaining portion L" protruding from within. More specifically, when the sealing member 460 is inserted so that the second retaining portion L" faces the first retaining portion L' inside the damper body 420, the elastic member 440 is compressed by the inner left surface of the damper body 420 and the inner right surface of the sealing member 460. This elasticity is transferred to the sealing member 460, allowing the sealing member 460 to seal the right side of the damper assembly 400. Accordingly, the sealing member 460 is elastically supported on its right end by the elastic member 440, and may be formed of a material that prevents leakage of air when subjected to elastic pressure, such as, for example, rubber.

The enclosing member 480 is provided at the outer surface of the damper body 420. The enclosing member 480 has an inner diameter corresponding to the outer diameter of the damper body 420, and may be force-fit over the damper body 420 so that the sealing member 460 is not dislodged from the damper body 420 through the open right side. An opening hole 482 is formed on the right side of the enclosing member 480 to allow the flow of air into the damper body 420. The size of the opening hole 482 is preferably smaller than the sealing member 460. Thus, the sealing member 460 is elastically biased to the right by the elastic member 440, and right side of the sealing member 460 seals the opening hole 482 to seal the right side of the damper body 420.

In certain embodiments of the invention, a portion of the damper body 420 may be made of a clear material, and this portion of the damper body 420 may be positioned corresponding to an opening 368 in the cover 360 such that it may be observed from outside the cover 360. When the damper assembly 400 is configured and positioned in this manner, the damper assembly 400 also provides an external indication of the increased internal pressure in the dust collecting unit, an excessive amount of debris collected in the canister, and/or a blockage in the hose 260. This visible indication may take many forms, including, for example, the visible compression of the elastic member 440. The visible indication may be further enhanced if the sealing member 460 is a color which may capture the attention of a user as the elastic member 440 is compressed and the sealing member 460 is drawn into the clear portion of the damper body 420 in response to the increased pressure. Such an external indicator provides a visible warning to a user that an excessive amount of debris has been collected in the dust collecting unit, and/or that the hose 260 is blocked, and that, although the damper assembly 400 has been actuated to temporarily alleviate the increased pressure, action should be taken by the user. Such an external indicator provides a positive indication to the user, rather than relying on the user's recognition of a loss of suction.

Figure 8:
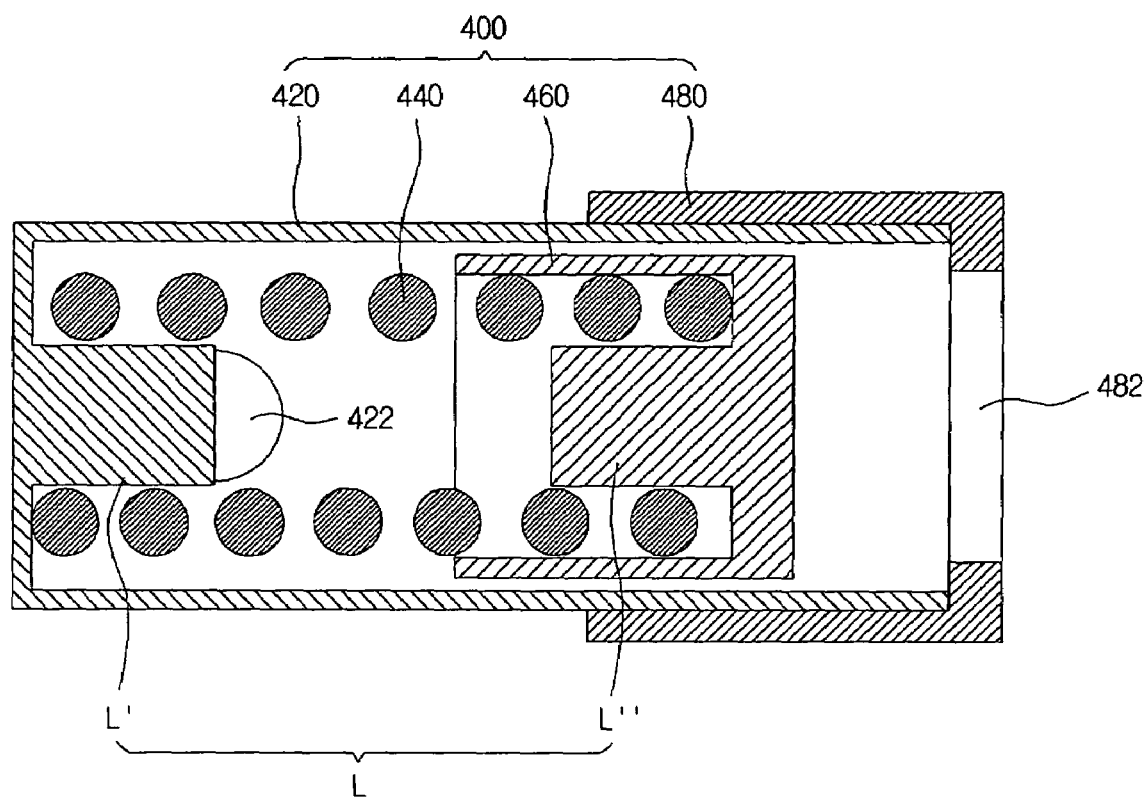
FIG. 8 is a sectional view of the damper assembly shown in FIG. 7.

Operation of a vacuum cleaner having the above-described structure will now be discussed with respect to FIG. 8, which is a schematic sectional view of the damper assembly shown in FIG. 7 during operation.

First, the handle 210 is grasped, the control button 212 is actuated to activate the vacuum cleaner, and the fan motor (not shown) rotates to generate a suction force. The suction force is transmitted through the suctioning port (not shown) formed on the bottom of the head 100, and foreign objects and air from the floor are sucked into the head 100.

The air and foreign object mixture sucked through the suctioning port sequentially passes through the suctioning hose 260, extension tube 250, and connecting hose (not shown), and enters the inside of the dust collecting unit 300, where the foreign objects are separated from the air, and the foreign objects are collected inside the dust collecting unit 300.

With respect to the flow of the air and foreign object mixture within the dust collecting unit 300, the air and foreign objects pass through the intake guide 322 and into the dust collecting canister 320. The air and foreign objects that enter the dust collecting canister 320 swirl around along the inner walls of the dust collecting canister 320, where heavier foreign objects fall to and remain on the bottom of the canister 320 and are collected. The air and the lighter foreign objects that remain pass through the holes 342 formed on the outer surface of the filter assembly 340 and are filtered by means of the filter 344 within the filter assembly 340. The filtered air flows inside the filter 344 and moves through the hole 374 in the space forming plate 370 and then through the exhaust passage 366, where it is expelled through the exhaust guide hole 298.

In this instance, the damper assembly 400 does not operate, and air does not flow through the damper assembly 400 because the sealing member 460 is elastically supported to the right by the elastic member 440, thus sealing the opening hole 482, as shown in FIG. 7.

However, when a large quantity of foreign objects are collected inside the dust collecting canister 320, airflow is hindered, and the fan motor is subjected to an overload. More specifically, if the holes 342 in the filter assembly 340 and the outer surface of the filter 344 are clogged by a large quantity of foreign objects, the flow of air is hindered, causing pressure to increase inside the dust collecting unit 300, thereby causing an overload on the fan motor. When this happens, the damper assembly 400 can be selectively opened in response to this increased pressure to supply air from the outside to the inside of the dust collecting canister 320 in order to alleviate pressure and remove the overload on the fan motor.

The operation of the damper assembly 400 will now be described with respect to FIGS. 5 through 8. When pressure increases in the dust collecting canister 320, the increased pressure is transferred through the through-hole 376 to the damper assembly 400. This increased pressure transferred to the damper assembly 400 causes the sealing member 460 to deviate from its initial position, as shown in FIG. 7, to the position shown in FIG. 8. When the sealing member 460 moves to the left, the right surface of the sealing member 460 moves away from the opening hole 482, allowing outside air to enter the inside of the damper assembly 400.

In further detail, air flows through the outside air intake hole 368 (shown in FIG. 5) formed on the outer surface of the dust collecting cover 360 from outside the dust collecting unit 300 into the dust collecting cover 360. Then, the air that enters the inside of the dust collecting cover 360 flows through the opening hole 482 into the damper assembly 400. The outside air that enters the inside of the damper assembly 400 flows through the damper body 420, and then sequentially through the damper passage 422 and the through-hole 376 to supply additional air to the fan motor. Through this action, damage to the fan motor due to an overload condition can be prevented.

When the excess of foreign objects are removed from the inside of the dust collecting unit 300 and pressure therein returns to a suitable level for vacuuming, the sealing member 460 returns to its original position as shown in FIG. 7 through the elastic return force provided by the elastic member 440, and the damper assembly 400 is sealed again on its right side.

As described above, the invention provides for installation of a damper assembly inside a dust collecting unit such that when an overload condition on a fan motor is encountered, the damper assembly can be selectively opened in response to an increase in internal pressure to prevent damage to the fan motor. The damper assembly may also provide an external indication of the increased pressure condition to alert the user.

Accordingly, when a large quantity of foreign objects are accumulated inside the dust collecting unit, the reaction time to an overload condition encountered by the fan motor both by the damper assembly and the user, are significantly reduced.

Because reaction time to the overload condition encountered the fan motor is reduced, operating performance of the damper assembly is enhanced, and damage to the fan motor caused by an overload can be avoided.

By avoiding damage to the fan motor, repair expenses, loss of use, and other inconveniences can be avoided, thereby increasing customer satisfaction with the product.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A dust collecting unit for a vacuum cleaner, comprising:
a canister configured to receive air and foreign objects drawn therein, and to collect the foreign objects therein;
a filter assembly provided within the canister and configured to filter out the foreign objects and allow the air to pass therethrough;
a cover positioned at an open end of the canister and configured to guide the air that passes through the filter assembly toward an exhaust;
a plate coupled to a bottom of the cover so as to form a bottom surface of the cover and define an interior space therebetween, wherein the plate is configured to provide for communication between an interior of the filter assembly and the interior space of the cover; and
a damper assembly installed on the plate and configured to operate in response to an internal pressure in the dust collecting unit which exceeds a predetermined internal pressure.

2. The dust collecting unit of claim 1, wherein the plate is formed with a first hole configured to guide a flow of air from the canister into the cover.

3. The dust collecting unit of claim 2, wherein the plate further comprises a second hole configured to provide for communication between the first hole and the damper assembly.

4. The dust collecting unit of claim 3, wherein the damper assembly comprises:
a substantially tubular body which is in communication with the first hole and the interior of the cover, wherein the body is configured to selectively guide air from inside the cover to an interior portion of the canister;
an elastic member positioned within the body and configured to position the sealing member within the body based on an internal pressure in the dust collecting unit;
a sealing member elastically supported by the elastic member and configured to seal an open portion of the damper body; and
an enclosing member coupled to the body so as to maintain the sealing member within the body.

5. The dust collecting unit of claim 4, wherein the damper assembly further comprises a retaining portion configured to maintain an alignment of the elastic member within the body.

6. The dust collecting unit of claim 5, wherein the retaining portion comprises a first retaining portion which protrudes from one end of the body, and a second retaining portion which protrudes from the sealing member such that the first and second retaining portions extend towards one another within an interior portion of the body.

7. The dust collecting unit of claim 5, wherein the cover further comprises an outside air intake hole extending through a surface thereof, wherein the outside air intake hole is configured to allow external air to enter the interior of the cover during operation of the damper assembly.

8. The dust collecting unit of claim 7, wherein the external air which enters the interior of the cover through the intake hole is drawn into the damper assembly through the open portion of the damper assembly, out through the second hole and in to the canister through the first hole in the plate so as to reduce an internal pressure in the canister during operation of the damper assembly.

9. The dust collecting unit of claim 4, wherein the body and sealing member are configured to allow external air to enter into the damper assembly through the open portion of the damper assembly when the damper assembly is activated in response to an internal pressure in the dust collecting unit which exceeds the predetermined internal pressure.

10. The dust collecting unit of claim 4, wherein the sealing member is positioned substantially flush against the open portion of the body when the damper assembly is deactivated in response to an internal pressure in the dust collecting unit which is below the predetermined internal pressure.

11. The dust collecting unit of claim 4, wherein the elastic member comprises a spring positioned longitudinally within the substantially tubular body.

12. The dust collecting unit of claim 11, wherein the spring is configured to be compressed from an initial position in which the sealing member seals the open portion of the body, and to move the sealing member away from the open portion of the body so as to allow air to pass therethrough when an internal pressure in the dust collecting unit exceeds the predetermined internal pressure.

13. The dust collecting unit of claim 12, wherein the spring is configured to return to its initial position and to move the sealing member towards the open portion of the body so as to seal the open portion of the body and inhibit the flow of air therethrough when the internal pressure within the dust collecting unit falls below the predetermined internal pressure.

14. The dust collecting unit of claim 12, wherein the predetermined internal pressure is a pressure which is indicative of an overload condition experienced by the fan.

15. The dust collecting unit of claim 4, wherein at least a portion of the damper assembly is visible from an exterior of the cover, and wherein the damper assembly is configured to provide a visual indication through the visible portion thereof when the internal pressure in the dust collecting unit exceeds the predetermined internal pressure.

16. The dust collecting unit of claim 1, wherein the damper assembly is configured to provide an indication that an amount of foreign objects collected in the canister has exceeded a predetermined amount or that air flow has been restricted.

17. A vacuum cleaner comprising the dust collecting unit of claim 1.

* * * * *